June 27, 1950     H. KERSHAW     2,513,096
BOTTLE CRATE
Filed Oct. 18, 1947     2 Sheets-Sheet 1
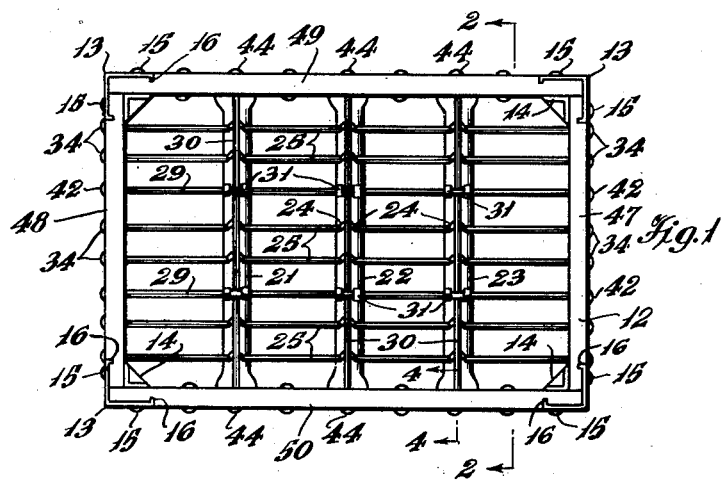
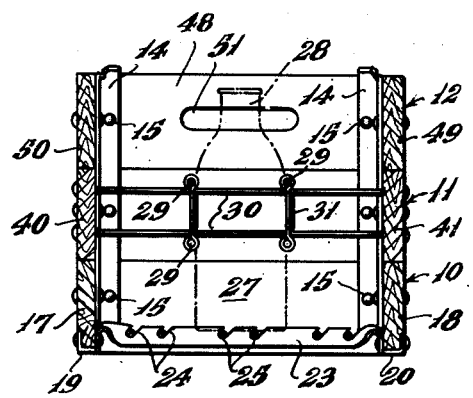
Fig. 2
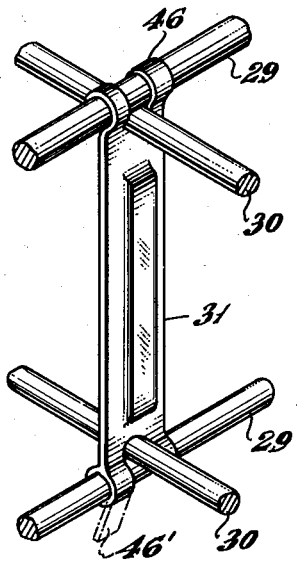
Fig. 3
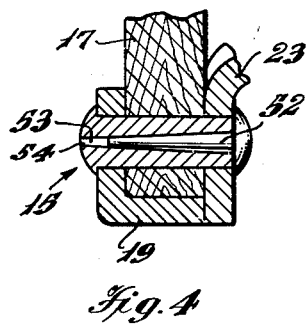
Fig. 4
INVENTOR.
*Herbert Kershaw*
BY *A. John Michel*
ATTORNEY June 27, 1950  H. KERSHAW  2,513,096
BOTTLE CRATE
Filed Oct. 18, 1947  2 Sheets-Sheet 2
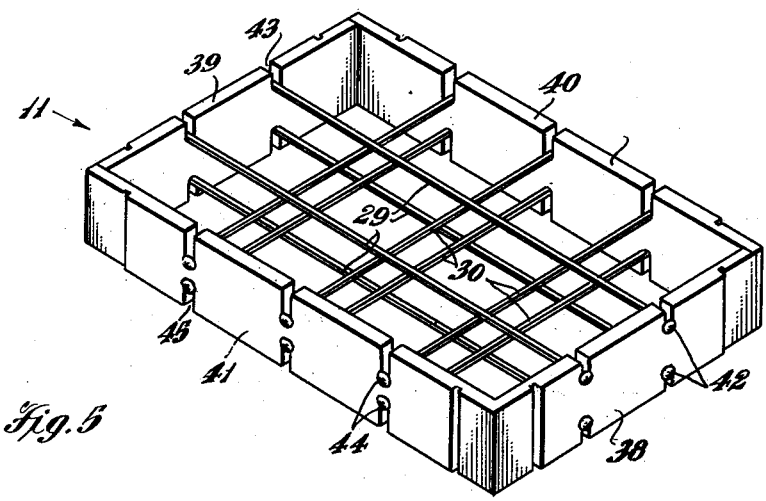
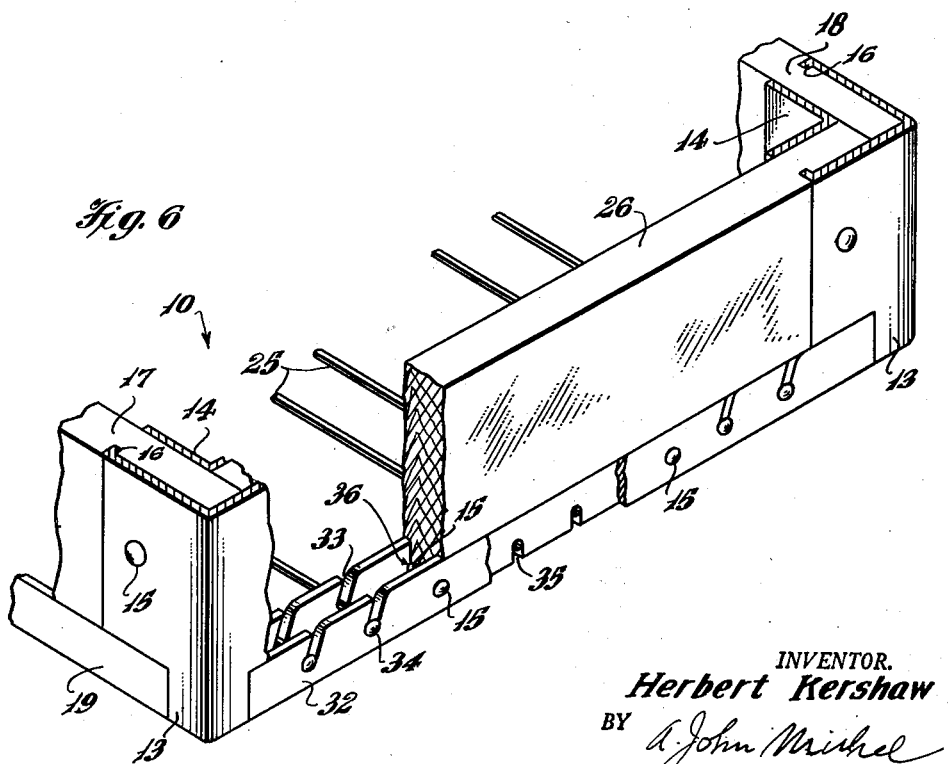
INVENTOR.
Herbert Kershaw
BY
ATTORNEY Patented June 27, 1950

2,513,096

UNITED STATES PATENT OFFICE 2,513,096

BOTTLE CRATE

Herbert Kershaw, Brooklyn, N. Y.

Application October 18, 1947, Serial No. 780,655

2 Claims. (Cl. 217—19)

The present invention relates to milk crates.

The conventional milk crate has wooden sides formed by superimposing a plurality of (say three or four) rectangular frames on one another, a bottom consisting of a number of parallel rods or wires held by the lowest frame and one or more transverse supporting members, and a system of intersecting rods or wires secured to an intermediate frame to form a plurality of (usually twelve) compartments for individual milk bottles. All of the individual elements of such a crate are relatively easily and cheaply manufactured by a mass production process, which is as it should be if the cost of distributing a basic commodity, i. e. milk, is not to be unduly increased.

The assembly of such a crate, however, is not always as expeditious as desired from the above viewpoint; in particular, the anchoring of the various rods in the associated frame members is a rather slow process. Thus the rods are conventionally provided with a single head and are successively passed through suitable holes provided in the boards, metal bars, etc., by which they are supported; after this is done, the projecting ends of the wires are individually spun to form a head thereon which will prevent the withdrawal of the wire.

A general object of my invention is, therefore, to provide a milk crate using parts which are not only cheaply manufactured but also rapidly and economically assembled.

Another object of the invention is to provide a milk crate of substantially conventional appearance, yet with such modifications of its elements that the process of assembling the crate is appreciably accelerated.

A further object of my invention is to provide a method of assembling a milk crate in which each rod is originally formed with two heads and is fixed in position by means of slotted supporting members.

Still another object is to provide a milk crate which may be rapidly taken apart and reassembled for the purpose of replacing worn or broken parts.

Yet a further object is to provide, in a milk crate, an assembly of tightly fitting parts so as to substantially eliminate rattling.

The above and other objects will become fully apparent from the following description, reference being had to the accompanying drawing in which:

Figure 1 is a top view of a milk crate according to the invention;

Figure 2 is a cross-section taken on the line 2—2 of Figure 1;

Figures 3 and 4 illustrate structural details, Figure 4 being a section on line 4—4 of Figure 1.

Figure 5 shows the compartment-forming insert; and

Figure 6 is a fragmentary perspective view of the base of the milk crate.

Referring first to Figures 1 and 2, a milk crate of generally conventional appearance comprises a lower frame 10, an intermediate frame 11 and an upper frame 12, the boards of each frame being secured to one another and to those of the other frames by means of four outer angle irons 13 and four inner angle irons 14, using any suitable fastener such as rivets 15. The outer angle irons 13 have inturned edges 16 which engage corresponding grooves provided in the respective boards. From Figure 1 it will also be seen that the ends of the boards are recessed to let the outside of the angle irons 13 come up flush against the frames, and in similar manner the side members 17, 18 of the lower frame 10 are rabbeted to accommodate angle irons 19, 20 respectively (see also Figure 6).

Secured by rivets 15 to the side boards 17 and 18 are three transverse supports or bridges 21, 22 and 23, formed with six slanting slots 24 at the bottom of which there are disposed three pairs of longitudinally extending wires 25 which are also secured, in a manner subsequently to be described, to the end boards 26 (Figure 6) and 27 of the frame 10. The wires or rods 25 support the bottles 28 as they are received in the twelve compartments formed by two longitudinally extending pairs of vertically spaced wires 29 and three similar pairs of transverse-running wires 30. The wires 29 and 30 are attached to one another by tie members 31 and are anchored in the boards of the frame 11 as more fully described hereinafter.

How the ends of the rods 25 are inserted into the frame 10 is illustrated in Figure 6 in which the end board 26 and associated members are partly broken away for greater clarity. A channel member 32, having six pairs of slots 33 similar to the slots 24 and slanted at the same angle, receives the end board 26 after the ends of the rods 25 have been placed in respective slots 33. Each of the ends of each rod 25 carries a head 34 by which it abuts the outer surface of a respective channel member 32. When the rods are in place, the reduced lower end of the boards 26, 27 is lowered into the channels 32 in such a manner that slots 35, provided in each of said boards, straddle the wires 25 and hold them down. Next the boards are secured to the channel members by rivets 15 which pass through aligned holes 36. Finally the inner and outer angle irons 14 and 13 are riveted to the boards 17, 18, 26 and 27 to complete the frame 10.

The frame 11, shown in Figure 5, comprises two side boards 38, 39 and two end boards 40, 41 aligned with corresponding boards of the frame 10. The longitudinal wires 29, each with its heads 42, are placed in respective notches 43 provided in the end boards 40 and 41 while the transverse rods 30, each with two heads 44, are positioned in similar notches 45 provided in the side boards 38 and 39. The tie members 31, which hold these rods together, are not shown in Figure 5 but have been illustrated in detail in Figure 3 where it will be seen that they have two bifurcated ends formed by prongs 46, each pair of prongs straddling a wire 30 and being inturned to grip a wire 29 whereby the rod 30 is held in its place. Preferably, a member 31 is provided at each point of intersection between the longitudinal wires 29 and the transverse wires 30.

After the rods 29 and 30 have been assembled on the frame 11, the latter is placed above the frame 10 and is riveted to the angle irons 13 and 14. Next the four boards 47, 48, 49 and 50 are placed above corresponding boards of the frame 11, being secured to the angle irons 13 and 14 by riveting to form the frame 12. Boards 49 and 50 may be provided with the usual finger holes 51 as shown in Figure 2. It will be seen that the angle irons 13 project slightly above the boards of frame 12 to provide seats for the stacking of several crates as is known per se.

From the foregoing description it will be seen that a milk crate according to my invention may be assembled very rapidly since the time-consuming spinning of heads onto the wires, after their insertion into the supporting frames, is completely dispensed with. In the case of the wires 29 and 30 this is accomplished by slotting rather than drilling the boards of the frame 11 and using tie members of the type shown in Figure 3 to clamp the wires together, it being understood that said tie members are placed in position and their prongs (46', Figure 3) turned in after the wires are in place. In the assembly of the frame 10, the wires 25 are simply rolled into the aligned slots 24, 33 of the supports 21, 22, 23 and the two channel members 32 whereupon the boards 26, 27 are inserted into the members 32 and riveted thereto.

While the tie members 31 shown in Figure 3 are known per se, they have been found to be of particular advantage in combination with the feature of my invention. Other types of connectors may, however, be substituted for them as long as they are adapted to be used with wires that are headed or finished at both ends.

If any part of the improved milk crate according to my invention becomes worn and needs to be replaced, this will be possible without the necessity of pinching off the heads of one or more wires as would be required in conventional crates. It will, however, still be necessary to cut off the heads of a number of rivets if the rivets 15 are of the usual form. I therefore propose to use the type of rivet shown in Figure 4 which, as far as I am aware, has never heretofore been proposed for milk crates. This rivet has a tapered male part 52 entering the tapered bore of a female part 53. The two complementary tapers form a very tight seal which will not be broken by normal axial stresses, yet the parts may be readily separated by inserting a pin into the bore 54 of parts 53 and rapping sharply at the other end of said pin. Thus, by using this type of rivet throughout (with the female part 53 preferably on the outside), there will be provided a milk crate which may be disassembled, either partially or completely, in a rapid and expeditious manner.

The invention also overcomes another disadvantage common with conventional milk crates, namely, the rattling of parts caused by a loose assembly. It is clear that in crates assembled by the usual method it will be necessary to make the diameter of the holes rather larger than that of the wires to be received thereby, so as not unduly to complicate the task of passing the wires through said holes. In a crate according to the invention the wires will be securely clamped, with a minimum of clearance, between the channel members 32 and the end boards 26, 27 while the slanting holes 24 will also reduce the danger of noisy vibrations at the bridge members 21—23.

Although the invention has been described with reference to a single, preferred embodiment, it is to be understood that the invention is not limited to the form shown and described and that adaptations and modifications will be possible without departing from the spirit and scope of the invention as defined in the objects and in the appended claims.

I claim:

1. A milk crate comprising a plurality of substantially rectangular wooden frames including a lower frame, an upper frame and an intermediate frame superimposed upon one another, a plurality of rods extending between the shorter boards of said lower frame, the underside of each of said shorter boards having slots engaging the ends of said rods, a metal channel member straddling the slotted lower portion of each of said boards, said member having slanting slots likewise engaging the ends of said rods, at least one metal bridge member extending between the longer boards of said lower frame and having slanting slots engaging said rods at intermediate points, said last-mentioned slots being substantially parallel to those of said channel members, a plurality of longitudinal and transverse rods held near the upper edge of said intermediate frame in slots extending downward from said upper edge, a plurality of longitudinal and transverse rods held near the lower edge of said intermediate frame in slots extending upward from said lower edge, tie means engaging at least certain of said upper transverse and longitudinal rods at the intersection thereof and connecting said rods to corresponding ones of said lower transverse and longitudinal rods at the intersection of the latter, angle members disposed at the corners of said frames to hold said frames together, and fastening means securing said angle, bridge and channel members to respective boards of the said frames.

2. A milk crate according to claim 1 wherein each of said rods has two heads preventing the axial displacement thereof.

HERBERT KERSHAW.

REFERENCES CITED

The following references are of record in the file of this patent:

UNITED STATES PATENTS

| Number | Name | Date |
| --- | --- | --- |
| 646,738 | Ingalls | Apr. 3, 1900 |
| 1,876,323 | Sloat | Sept. 6, 1932 |
| 1,923,344 | Walker | Aug. 22, 1933 |
| 1,949,674 | Birnstock | Mar. 6, 1934 |
| 2,238,822 | Priest | Apr. 15, 1941 |
| 2,266,225 | Mahler | Dec. 16, 1941 |

FOREIGN PATENTS

| Number | Country | Date |
| --- | --- | --- |
| 299,273 | Great Britain | Oct. 25, 1928 |